(12) United States Patent
Guida

(10) Patent No.: US 11,884,383 B2
(45) Date of Patent: *Jan. 30, 2024

(54) ACTIVE WINGLET

(71) Applicant: Tamarack Aerospace Group, Inc., Sandpoint, ID (US)

(72) Inventor: Nicholas R. Guida, Sagle, ID (US)

(73) Assignee: Tamarack Aerospace Group, Inc., Sandpoint, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/694,875

(22) Filed: Nov. 25, 2019

(65) Prior Publication Data

US 2020/0283130 A1    Sep. 10, 2020

Related U.S. Application Data

(63) Continuation of application No. 15/707,991, filed on Sep. 18, 2017, now Pat. No. 10,486,797, which is a continuation of application No. 14/222,437, filed on Mar. 21, 2014, now Pat. No. 9,764,825, which is a continuation of application No. 13/075,934, filed on Mar. 30, 2011, now Pat. No. 8,684,315, which is a
(Continued)

(51) Int. Cl.
*B64C 23/06* (2006.01)
*B64C 13/16* (2006.01)

(52) U.S. Cl.
CPC ............ *B64C 23/076* (2017.05); *B64C 13/16* (2013.01); *B64C 23/065* (2013.01); *Y02T 50/10* (2013.01)

(58) Field of Classification Search
CPC ..... B64C 13/16; B64C 23/065; B64C 23/069; B64C 23/072; B64C 23/076
See application file for complete search history.

(56) References Cited

U.S. PATENT DOCUMENTS

| 2,074,201 A | 3/1937 | Bechereau |
| D144,143 S | 3/1946 | Scott |
| 2,418,301 A | 4/1947 | Heal |

(Continued)

FOREIGN PATENT DOCUMENTS

| DE | 2149956 | 4/1973 |
| DE | 10313290 | 10/2004 |

(Continued)

OTHER PUBLICATIONS

European Office Action dated Feb. 24, 2021 for European Patent Application No. 13773104.8, a counterpart foreign application of U.S. Pat. No. 9,162,755, 5 pages.
(Continued)

*Primary Examiner* — Joseph W Sanderson
(74) *Attorney, Agent, or Firm* — Lee & Hayes, P.C.

(57) ABSTRACT

An active winglet includes a body portion substantially parallel to a wing of an aircraft, as if it were an extension of the wing. The body portion is attachable to an aircraft wing and includes a controllable airflow modification device coupled thereto. By virtue of having a controllable airflow modification device, the winglet is capable of adjusting a control surface of the controllable airflow modification device in response to in-flight conditions, to reduce wing loads, increase range, and/or increase efficiency.

20 Claims, 8 Drawing Sheets

Related U.S. Application Data continuation of application No. 12/797,742, filed on Jun. 10, 2010, now abandoned.

(60) Provisional application No. 61/265,534, filed on Dec. 1, 2009.

(56) References Cited

U.S. PATENT DOCUMENTS

| | | | |
|---|---|---|---|
| 2,576,981 | A | 12/1951 | Vogt |
| 3,218,005 | A | 11/1965 | Calderon |
| 3,845,918 | A | 11/1974 | White, Jr. |
| 4,017,041 | A | 4/1977 | Nelson |
| 4,172,574 | A | 10/1979 | Spillman |
| 4,190,219 | A | 2/1980 | Hackett |
| 4,205,810 | A | 6/1980 | Shimitsu |
| 4,240,597 | A | 12/1980 | Ellis et al. |
| 4,245,804 | A | 1/1981 | Ishimitsu et al. |
| 4,247,062 | A | 1/1981 | Brueckner |
| 4,247,063 | A | 1/1981 | Jenkins |
| 4,272,043 | A | 6/1981 | Spillman |
| 4,365,773 | A | 12/1982 | Wolkovitch |
| 4,382,569 | A | 5/1983 | Boppe et al. |
| 4,455,004 | A | 6/1984 | Whitaker, Sr. |
| 4,457,479 | A | 7/1984 | Daude |
| 4,545,552 | A | 10/1985 | Welles |
| 4,591,113 | A | 5/1986 | Mabey |
| 4,671,473 | A | 6/1987 | Goodson |
| 4,674,709 | A | 6/1987 | Welles |
| 4,720,062 | A | 1/1988 | Warrink et al. |
| 4,722,499 | A | 2/1988 | Klug |
| 4,725,020 | A | 2/1988 | Whitener |
| 5,039,032 | A | 8/1991 | Rudolph |
| 5,072,894 | A | 12/1991 | Cichy |
| 5,100,081 | A | 3/1992 | Thomas |
| 5,156,358 | A | 10/1992 | Gerhardt |
| 5,348,253 | A | 9/1994 | Gratzer |
| 5,407,150 | A | 4/1995 | Sadleir |
| 5,899,409 | A | 5/1999 | Frediani |
| 5,988,563 | A | 11/1999 | Allen |
| 6,095,459 | A | 8/2000 | Codina |
| 6,161,801 | A | 12/2000 | Kelm et al. |
| 6,227,487 | B1 | 5/2001 | Clark |
| 6,297,486 | B1 | 10/2001 | Rom et al. |
| 6,345,790 | B1 | 2/2002 | Brix |
| 6,394,397 | B1 | 5/2002 | Ngo et al. |
| 6,422,518 | B1 | 7/2002 | Stuff et al. |
| 6,484,968 | B2 | 11/2002 | Felker |
| 6,666,666 | B1 | 12/2003 | Gilbert et al. |
| 6,766,981 | B2 | 7/2004 | Volk |
| 6,923,404 | B1 | 8/2005 | Liu et al. |
| 7,275,722 | B2 | 10/2007 | Irving et al. |
| 7,475,848 | B2 | 1/2009 | Morgenstern et al. |
| 7,744,038 | B2 | 6/2010 | Sankrithi et al. |
| 7,900,877 | B1 | 3/2011 | Guida |
| 7,922,115 | B2 | 4/2011 | Colgren et al. |
| 8,191,832 | B2 | 6/2012 | Berthereau et al. |
| 8,544,800 | B2 | 10/2013 | Stuhr |
| 8,651,431 | B1 | 2/2014 | White et al. |
| 8,684,315 | B2 | 4/2014 | Guida |
| 9,162,755 | B2 | 10/2015 | Guida |
| 9,567,066 | B2* | 2/2017 | Guida ................... B64C 13/16 |
| 9,764,825 | B2 | 9/2017 | Guida |
| 9,969,487 | B2 | 5/2018 | Guida |
| 10,486,797 | B2* | 11/2019 | Guida ................... B64C 13/16 |
| 10,562,610 | B2* | 2/2020 | Guida ................... B64C 13/16 |
| 10,562,613 | B2* | 2/2020 | Guida ................... B64C 23/072 |
| 11,111,006 | B2* | 9/2021 | Guida ................... B64C 23/076 |
| 2004/0155157 | A1 | 8/2004 | Bray |
| 2006/0049307 | A1 | 3/2006 | Schweiger |
| 2007/0018049 | A1 | 1/2007 | Stuhr |
| 2007/0114327 | A1 | 5/2007 | Dees et al. |
| 2008/0308683 | A1 | 12/2008 | Sankrithi et al. |
| 2009/0200431 | A1 | 8/2009 | Konings et al. |
| 2009/0256029 | A1 | 10/2009 | Malachowski et al. |
| 2009/0266938 | A1 | 10/2009 | Berthereau et al. |
| 2009/0292405 | A1 | 11/2009 | Najmabadi et al. |
| 2010/0006706 | A1 | 1/2010 | Breitsamter et al. |
| 2010/0163669 | A1 | 7/2010 | Im |
| 2011/0127383 | A1 | 6/2011 | Guida |
| 2011/0186689 | A1 | 8/2011 | Guida |
| 2012/0187251 | A1 | 7/2012 | Guida |
| 2014/0306067 | A1 | 10/2014 | Guida |
| 2015/0008291 | A1 | 1/2015 | Guida |
| 2016/0009378 | A1 | 1/2016 | Guida |
| 2018/0029696 | A1 | 2/2018 | Guida |
| 2018/0043985 | A1 | 2/2018 | Thompson |
| 2019/0055008 | A1 | 2/2019 | Guida |
| 2020/0324878 | A1* | 10/2020 | Guida ................... B64C 13/16 |
| 2021/0394889 | A1 | 12/2021 | Guida |

FOREIGN PATENT DOCUMENTS

| | | |
|---|---|---|
| FR | 2540824 A1 | 8/1984 |
| FR | 2636592 | 3/1990 |
| JP | 01254491 | 10/1989 |
| JP | H06502364 | 3/1994 |
| JP | 8104296 | 4/1996 |
| JP | 2009501678 | 1/2009 |
| JP | 2010503571 | 2/2010 |
| WO | WO2007018785 | 2/2007 |
| WO | WO2011068659 | 6/2011 |
| WO | WO2013151810 | 10/2013 |

OTHER PUBLICATIONS

Japanese Office Action dated Sep. 8, 2020 for Japanese Patent Application No. 2017-035382, a counterpart foreign application of U.S. Appl. No. 12/797,742, 5 pages.

Australian Office Action dated Jan. 19, 2015 for Australian patent application No. 2013200686, a counterpart foreign application of U.S. Appl. No. 12/797,742, 3 pages.

Australian Office Action dated Jun. 15, 2016 for Australian patent application No. 2013243818, a counterpart foreign application of U.S. Pat. No. 9,162,755, 2 pages.

Bagg, et al., "Review of Literature Pertaining to Raked Tip and Other Wingtip Modifications," retrieved on Sep. 7, 2010 at <<https://www.engineering.purdue.edu/AAE/Academics/Courses/aae490t/teams2003/rakedtip/Review%20of%20Literature.doc>>, 5 pages.

Berens, "Potential of Multi-Winglet Systems to Improve Aircraft Performance," retrieved on Sep. 7, 2010 at <<http://deposit.d-nb.de/cgi-bin/dokserv?idn=990039978&dok_var=d1&dok_ext=pdf&filename=990039978.pdf>> 265 pages.

Boeing, "Aerodynamics of Winglets," retrieved on Sep. 7, 2010 at <<http://www.boeing.com/commercial/aeromagazine/aero_17/winglet_story.html>>, 9 pages.

European Office Action dated Dec. 18, 2013 for European patent application No. 10821429.7, a counterpart foreign application of U.S. Appl. No. 12/890,557, 7 pages.

European Office Action dated Jun. 6, 2017 for European patent application No. 13773104.8, a counterpart foreign application of U.S. Pat. No. 9,162,755, 4 pages.

European Office Action dated Jul. 19, 2019 for Euoprean patent application No. 13773104.8, a counterpart foreign application of U.S. Pat. No. 7,900,877, 5 pages.

Extended European Search Report dated Nov. 30, 2012 for European patent application No. 10821429.7, 8 pages.

Extended European Search Report dated Nov. 6, 2015 for European patent application No. 13773104.8, 6 pages.

Fluent, Inc., "Winglet Designed with Computer Simulation Cuts Airliner's Fuel Consumption," JA1333, Copyright 2002, retrieved at <<http://www.fluent.com/solutions/articles/ja133.pdf>>. 5 pages.

Hale, "Investigation into the Application of Winglets on Canards for Tip Vortex Position Improvement," retrieved on Sep. 7, 2010 from <<http://seit.unsw.adfa.edu.au/ojs/index.php/juer/article/viewFile/250/152>>. 9 pages.

Japanese Office Action dated Nov. 19, 2019 for Japanese Patent Application No. 2017-035382, a counterpart of U.S. Appl. No. 12/797,742, 6 pages.

(56) References Cited

OTHER PUBLICATIONS

Japanese Office Action dated May 29, 2020 for Japanese Patent Application No. 2017-035382, a counterpart of U.S. Appl. No. 12/797,742, 2 pages.
Translated Japanese Office Action dated Jan. 29, 2019 for Japanse patent application No. 2017-035382, a counterpart foreign application of U.S. Pat. No. 7,900,877, 9 pages.
Translated Japanese Office Action dated Oct. 25, 2016 for Japanese patent application No. 2014-066151, a counterpart foreign application of U.S. Pat. No. 7,900,877, 5 pages.
Translated Japanese Office Action dated Dec. 22, 2015 for Japanese patent application No. 2014-096151, a counterpart foreign application of U.S. Appl. No. 12/797,742, 5 pages.
Translated Japanese Office Action dated Feb. 20, 2018 for Japanese patent application No. 2017-035382, a counterpart foreign application of U.S. Pat. No. 7,900,877, 6 pages.
Translated Japanese Office Action dated Feb. 7, 2017 for Japanese patent application No. 2015-504613, a counterpart foreign application of U.S. Pat. No. 9,162,755, 11 pages.
Translated Japanese Office Action dated Mar. 31, 2015 for Japanese patent application No. 2014-096151, a counterpart foreign application of U.S. Pat. No. 7,900,877, 6 pages.
Translated Japanese Office Action dated Aug. 29, 2017 for Japanese Patent Application No. 2015-504613, a counterpart foreign application of U.S. Pat. No. 9,162,755, 4 pages.
NASA, Dryden Flight Research Center—Winglets, retrieved on Sep. 7, 2010 from <<http://www.nasa.gov/centers/dryden/about/Organizations/Technology/Facts/TF-2004-15-DFRC.html>>, 3 pages.
Non Final Office Action dated Feb. 20, 2020 for U.S. Appl. No. 15/979,331 "Multiple Controlloable Airflow Modification Devices" Guida, 8 pages.
Final Office Action dated Feb. 27, 2019 for U.S. Appl. No. 15/707,991 "Active Winglet" Guida, 7 pages.
Office action for U.S. Appl. No. 14/222,437, dated Oct. 19, 2016, Guida, "Active Winglet", 6 pages.
Final Office Action for U.S. Appl. No. 13/438,614, dated Nov. 26, 2014, Nicholas R. Guida, "Multiple Controllable Airflow Modification Devices", 5 pages.
Non-Final Office Action for U.S. Appl. No. 13/075,934, dated Dec. 6, 2011, Nicholas R. Guida, "Active Winglet", 13 pages.
Office action for U.S. Appl. No. 14/222,437, dated Apr. 1, 2016, Guida, "Active Winglet", 13 pages.
Final Office Action for U.S. Appl. No. 13/075,934, dated May 1, 2012, Nicholas R. Guida, "Active Winglet", 5 pages.
Office Action for U.S. Appl. No. 13/438,614, dated May 28, 2014, Nicholas R. Guida, "Multiple Controllable Airflow Modification Devices", 11 pages.
Final Office Action for U.S. Appl. No. 14/887,139, dated Jun. 6, 2017, Nicholas R. Guida, "Multiple Controllable Airflow Modification Devices", 7 pages.
Office action for U.S. Appl. No. 15/707,991, dated Jul. 19, 2018, Guida, "Active Winglet", 12 pages.
Final Office Action dated Jul. 6, 2020 for U.S. Appl. No. 15/979,331 "Multiple Controlloable Airflow Modification Devices" Guida, 7 pages.
Office action for U.S. Appl. No. 14/887,139, dated Aug. 30, 2016, Guida, "Multiple Controllable Airflow Modification Devices", 10 pages.
Office action for U.S. Appl. No. 13/075,934, dated Sep. 6, 2013, Guida, "Active Winglet", 5 pages.
PCT Search Report and Written Opinion dated Aug. 19, 2011 for PCT application No. PCT/US10/56586, 10 pages.
PCT Search Report and Written Opinion dated Aug. 19, 2013 for PCT application No. PCT/US13/33577 15 pages.
Shelton, et al., "Active MultipleWinglets for Improved Unmanned-Aerial-Vehicle Performance," Journal of Aircraft, vol. 43, No. 1, Jan.-Feb. 2006, retrieved on Sep. 7, 2010 at http://pdf.aiaa.org/jaPreview/JA/2006/PVJA13987.pdf>>, 1 page.
Shelton, et al., "Active Multiple Winglets for Improved Unmanned-Aerial-Vehicle Performance," Jouranl of Aircraft, vol. 43, No. 1, Jan.-Feb. 2006, pp. 110-116.
Guida, U.S. Appl. No. 12/797,742 entitled "Active Winglet" filed Jun. 10, 2010.
European Office Action dated Jul. 22, 2022 for European Patent Application No. 13773104.8, a foreign counterpart to U.S. Pat. No. 9,162,755, 5 pages.

* cited by examiner

ACTIVE WINGLET

RELATED APPLICATION

This application is a continuation of U.S. patent application Ser. No. 15/707,991, filed Sep. 18, 2017, which is a continuation of U.S. patent application Ser. No. 14/222,437, entitled "Active Winglet", filed Mar. 21, 2014, which claims the benefit of U.S. patent application Ser. No. 13/075,934, entitled "Active Winglet," filed Mar. 30, 2011, which claims the benefit of U.S. patent application Ser. No. 12/797,742 entitled "Active Winglet," filed Jun. 10, 2010, which claims the benefit of U.S. Provisional Patent Application No. 61/265,534 entitled "Active Winglet," filed on Dec. 1, 2009, all of which are incorporated herein by reference.

BACKGROUND

There exists an ever growing need in the aviation industry to increase aircraft efficiencies and reduce the amount of fossil fuels consumed. Winglets have been designed and installed on many aircraft including large multi-passenger aircrafts to increase efficiency, performance, and aesthetics. Such winglets usually consist of a horizontal body portion that may attach to the end of a wing and an angled portion that may extend perpendicularly from the horizontal body portion. For example, a winglet may be attached to a pre-existing wing of an aircraft to increase flight efficiency, aircraft performance, or even to improve the aesthetics of the aircraft.

However, the cost to install a winglet on an aircraft is often prohibitive due to the requirement to engineer and certify the wing after the wing is installed. Thus, aftermarket installation of winglets has generally been reserved for large aircrafts owned and operated by large aircraft companies.

Existing winglets have limited utility, in that each winglet must be designed and certified for a specific wing of a specific aircraft model. Additionally, existing winglets, which are fixed, are unable to adapt to changes in in-flight conditions. Accordingly, there remains a need in the art for improved aircraft winglets.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

This application describes active winglets for improving the efficiency, performance, and aesthetics of an aircraft as well as decreasing the certification cost and time. Active winglets may include controllable airflow modification devices. By virtue of having controllable airflow modification devices, such active winglets may be able to adjust edges and/or portions of the control surfaces of a controllable airflow modification device in response to in-flight load factor data and flight condition data.

As discussed above, adding winglets to an existing wing improves airplane efficiency and performance by reducing drag. This performance benefit comes at the cost of adding additional stress to the wing that was not accounted for by the original airplane manufacturer. As a result, installing traditional passive winglets on airplanes is expensive because the wing must be fully analyzed, reverse engineered, and tested to determine if the wing has the structural ability to accommodate the addition of winglets. In most cases, structural wing modifications are required. In all cases, the useful life (fatigue life) of the wing is reduced, thereby increasing the total cost of airplane ownership to the customer. In contrast, the active winglets described herein reduce the engineering and certification costs because active winglets have a minimal (potentially even beneficial) structural effect while maintaining a positive aerodynamic effect. As previously noted, an active winglet according to this disclosure may have an airflow control system in the form of a controllable airflow modification device located on the winglet. This controllable airflow modification device located on the winglet may be adjusted, which may change the aerodynamic forces on the aircraft wing.

The active winglet on an aircraft may be designed to keep spanwise section loads at or below originally designed values for a given wing without a winglet. Thus, the active winglet may eliminate the requirement to have a wing reinforced due to the addition of the winglet. Additionally, the controllable airflow modification device of the active winglet may be configured to reduce the bending moment of the wing by moving the center of pressure of the wing inboard and/or reduce the impact of the winglet on the fatigue life of the wing. Therefore, the addition of the active winglet may not significantly decrease, if at all, the service life of the wing and/or the aircraft to which it is attached. In some instances, addition of an active winglet may even reduce fatigue and increase an overall service life of the wing and/or the aircraft to which it is attached. Additionally, in the same or other instances, addition of an active winglet may also increase the overall capacity of the wing carrying capability of the aircraft, thus increasing the aircraft's gross weight potential.

Illustrative Active Winglet

Figure 1:
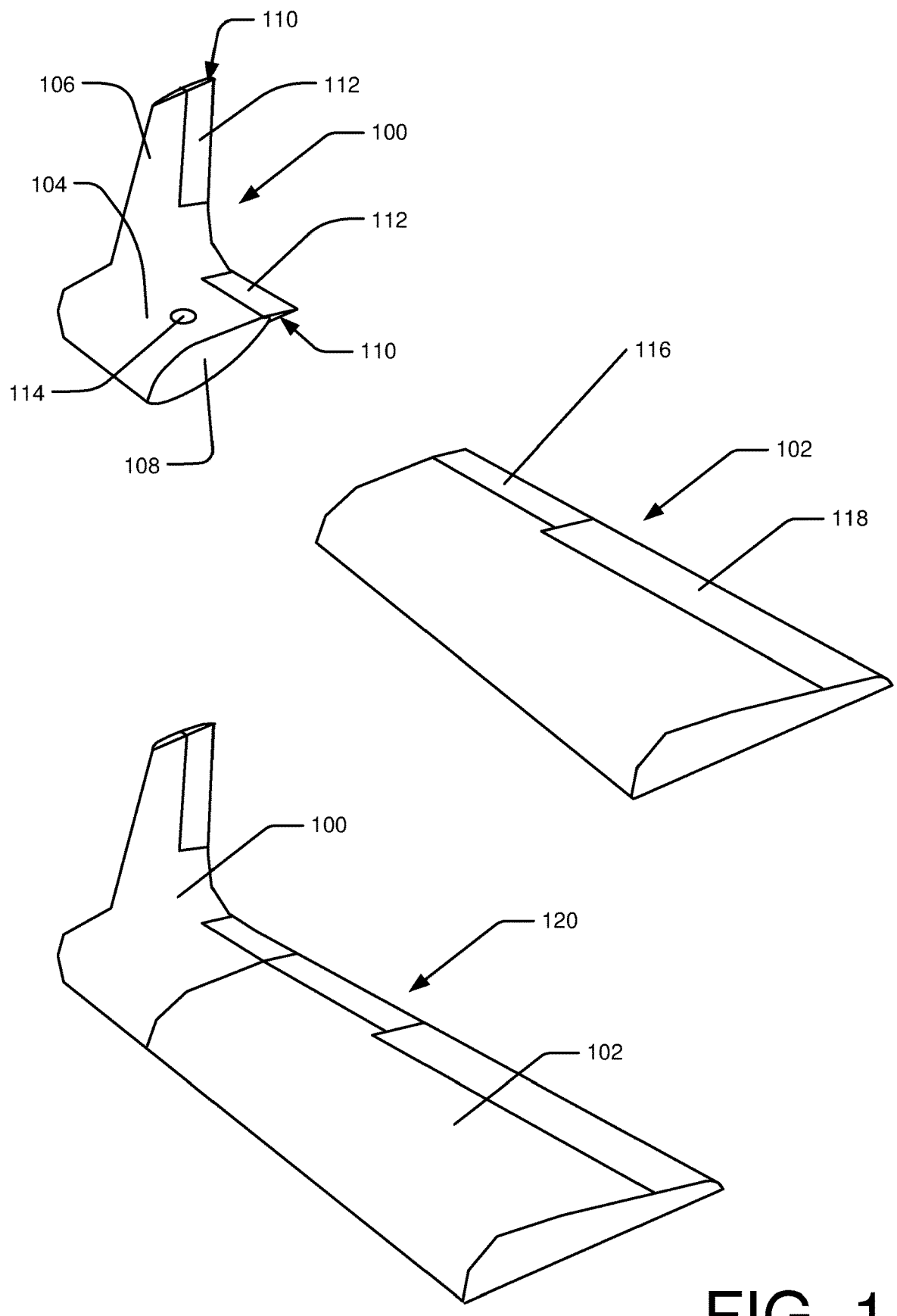
FIG. 1 depicts an illustrative active winglet attachable to a wing of an aircraft.

FIG. 1 depicts an illustrative active winglet 100 which may be attachable to a wing 102 of an aircraft (not shown). In one embodiment, the active winglet 100 may include a body portion 104 which may be substantially parallel to a horizontal plane and/or a wing of an aircraft. By way of example only, and not limitation, the active winglet 100 may also include an angled portion 106 on the outer side of the body portion 104 and an attachable portion 108 on the inner side of the body portion 104. In this example, the outer and inner sides of the body portion 104 are described with relation to the wing 102 such that the outer side is further from the wing 102 than the inner side. Additionally, the angled portion 106 may be substantially vertical in relation to the body portion 104 such that it projects perpendicularly from the body portion 104. However, in other embodiments, the angled portion 106 may be configured to project from the body portion 104 at angles other than 90 degrees. In yet other embodiments, the angled portion 106 may be configured to project from the body portion 104 at angles which include projecting downward (in relation to the aircraft). Additionally, although the angled portion 106 is described above as projecting from the outer side of the body portion 104, the active winglet 100 may be designed such that the angled portion 106 may project from the middle, or any other location, of the body portion 104 (i.e., the angled portion 106 may be located at any location between the inner and outer sides of the body portion 104).

The active winglet 100 may include a controllable airflow modification device 110 in the form of one or more control surfaces 112 located on the body portion 104 and/or the angled portion 106. By further way of example, in one embodiment, the controllable airflow modification device 110 may be located on the body portion 104 of the active winglet 100. In another embodiment, the controllable airflow modification device 110 may be located on the angled portion 106 of the active winglet 100. In yet another embodiment, the controllable airflow modification device 110 may be located on both the body portion 104 and the angled portion 106 of the active winglet 100. Further, and by way of example only, in the embodiment shown in FIG. 1, the controllable airflow modification device 110 is shown located on the aft of the active winglet 100 (i.e., the back-side of the active winglet 100 in relation to the front of an aircraft). In this way, adjustment of the controllable airflow modification device 110 may change the angle of the control surface 112 in relation to the aft portion (body portion 104 or angled portion 106) of the active winglet 100 that the control surface 112 is located. Additionally, as shown in FIG. 1, the active winglet 100 may include two controllable airflow modification devices 110; however, more or less controllable airflow modification devices 110 are possible.

Further, as shown in FIG. 1 by way of example only, the angled portion 106 is shown as a basic trapezoidal shape. However the angled portion 106 may be rectangular, triangular, oval, or any other geometric shape. Additionally, the airflow control surface 112 located on the angled portion 106, may be similar in shape to, or the same shape as, the airflow control surface 112 located on the body portion 104 of the active winglet 100.

Additionally, the active winglet 100 in FIG. 1 illustrates, by way of example and not limitation, a sensor 114 located in the center of the body portion 104 on the active winglet 100. However, the sensor 114 may be located anywhere on the active winglet 100, for example it may be located on the angled portion 106, on the front of the body portion 104 (in relation to the aircraft), on the aft of the body portion 104 (in relation to the aircraft), on the surface of the winglet 100, inside the winglet 100 (i.e., located within the surface of the winglet 100), anywhere within the entire aircraft, or the like.

Also depicted in FIG. 1, by way of example only, is an illustrative wing 102 of an aircraft (not shown) prior to the attachment of an active winglet 100 as described above. The wing 102 may include an aileron 116 and a flap 118. The aileron 116 and the flap 118 are used for flight control of the aircraft and in some instances may be controlled by one or more pilots of the aircraft.

FIG. 1 also depicts the illustrative modified wing 120 which may include the illustrative wing 102 coupled to the active winglet 100. The modified wing 120 may be designed and crafted for a new aircraft, or the active winglet 100 may be attached to the existing wing 102. The active winglet 100 of modified wing 120 may be configured in a similar shape as the existing wing 102. Additionally, and by way of example only, the winglet 100 may fit over a portion of the existing wing 102 such that the end of the existing wing 102 resides within the attachable portion 108 of the active winglet 100. In other embodiments, however, the active winglet 100 may be attached to the existing wing 102 by fastening the end of the existing wing 102 to the attachable portion 108. Further, the winglet 100 may be fabricated of the same or similar material as the existing wing 102.

Illustrative Aircraft with Active Winglet

Figure 2:
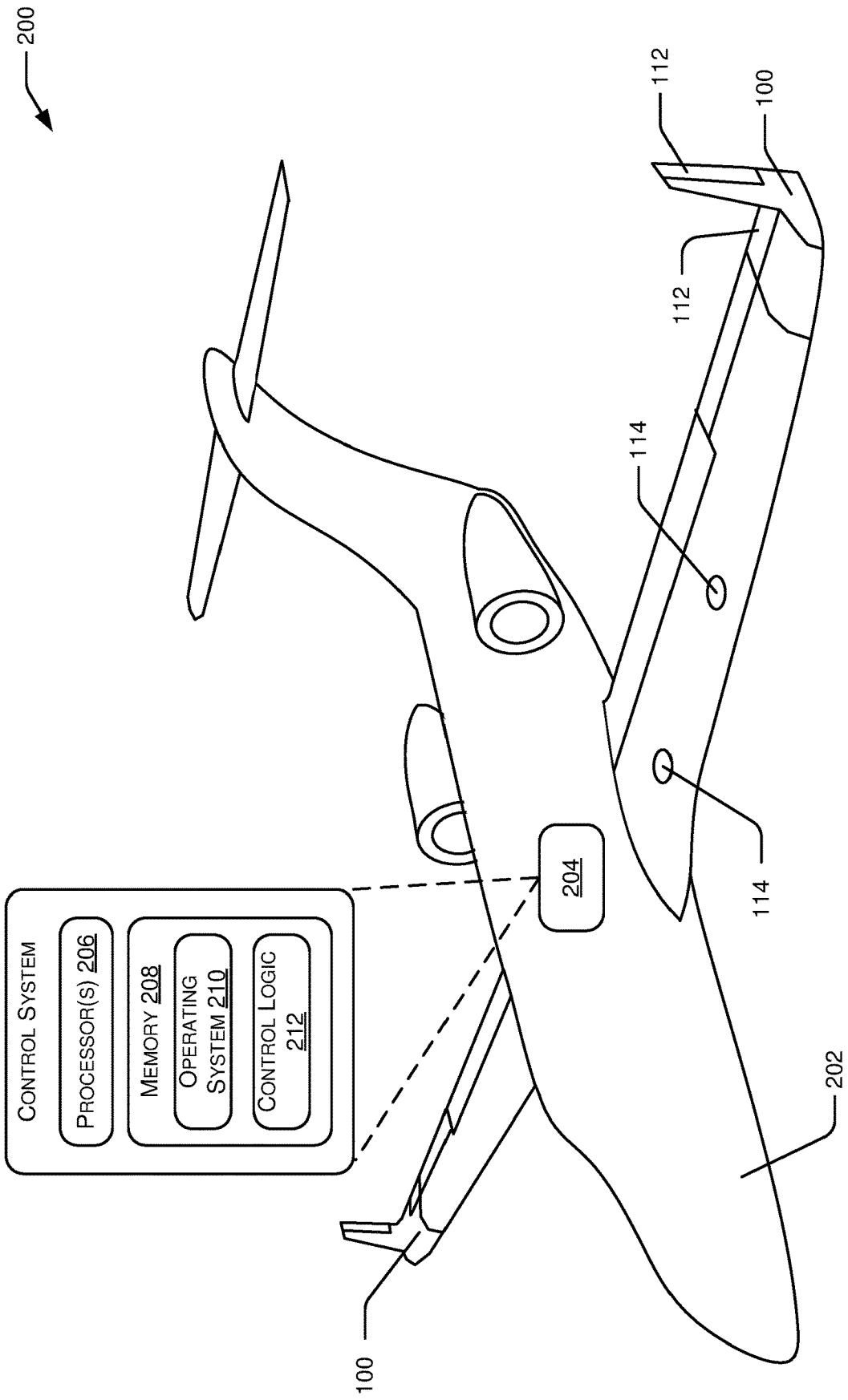
FIG. 2 depicts an illustrative aircraft with an attached active winglet.

FIG. 2 depicts an illustrative load alleviation system 200 implemented on an aircraft 202 that includes at least one attached active winglet 100. The components of the load alleviation system 200 may include sensors 114, active winglet(s) 100, a control system 204, and control surface(s) 112. By way of example only, and not limitation, FIG. 2 illustrates one active winglet 100 on each wing of the aircraft 202. However, active winglets 100 may also be placed on other surfaces of the aircraft 202. For example, the active winglets 100 may be located on the wings, as shown, or they may be located on the tail wings, or any other horizontal or vertical surface of the aircraft 202.

As mentioned above, the load alleviation system may comprise a control system 204. The control system 202 may be configured to control the active winglets 100 of the aircraft 202. By way of example only, and not limitation, the control system 204 may include one or more processor(s) 206 for receiving and processing system data, including, but not limited to, in-flight load factor data. In one embodiment, the processor(s) 206 may receive in-flight data from the sensors 114. As mentioned above with respect to FIG. 1, although the sensors 114 are shown on the wing they may be located anywhere on the aircraft. The control system 204 may additionally consist of memory 208 for the storage of in-flight load factor data. The data stored in the memory 208 may include previously received load factor data, currently recorded (i.e., current in-flight) load factor data, or a compilation of current in-flight data and/or previously recorded in-flight data. By way of example only, the memory 208 of the control system 204 may include an operating system 210 and control logic 212.

The operating system 210 may be responsible operating the control system 204 by way of interfacing the data with the processor(s) 206 and providing a graphical user interface (not shown) for interaction with one or more pilots of the aircraft 202. The control logic 212 of the control system 204 may be configured to operate the control surface(s) 112 of the controllable airflow modification devices 110 of the active winglet 100. In one embodiment, the control logic 212 may control the control surface(s) 112 based on in-flight load factor data received from the sensor(s) 114. Additionally, although not shown here, predetermined parameters may be stored in the memory 206. The predetermined parameters may also be used by the control logic 212 to determine operation of the control surface(s) 112. In some embodiments, the control system 204 may operate each control surface 112 simultaneously or independently. By way of example only, the control system 204 of FIG. 2 is illustrated in the hull of the aircraft 202; however, it can be located anywhere on the aircraft, including, but not limited to, the cockpit, the tail, the wing, or the like.

Illustrative Airflow Modification Devices

Figure 3:
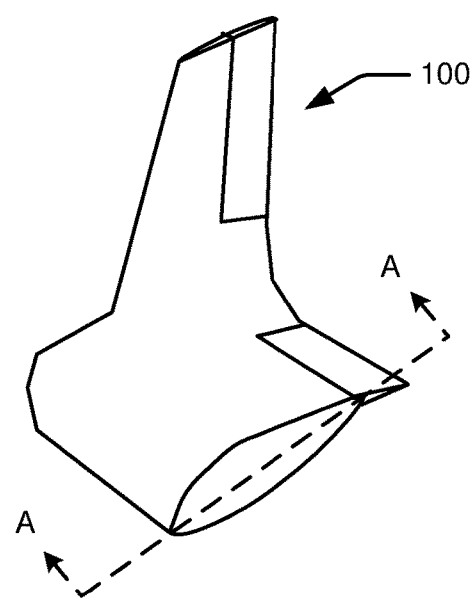
FIG. 3 depicts the illustrative active winglet of FIG. 1 and a cross-sectional view of the active winglet, taken along line A-A of FIG. 3.
Figure 3:
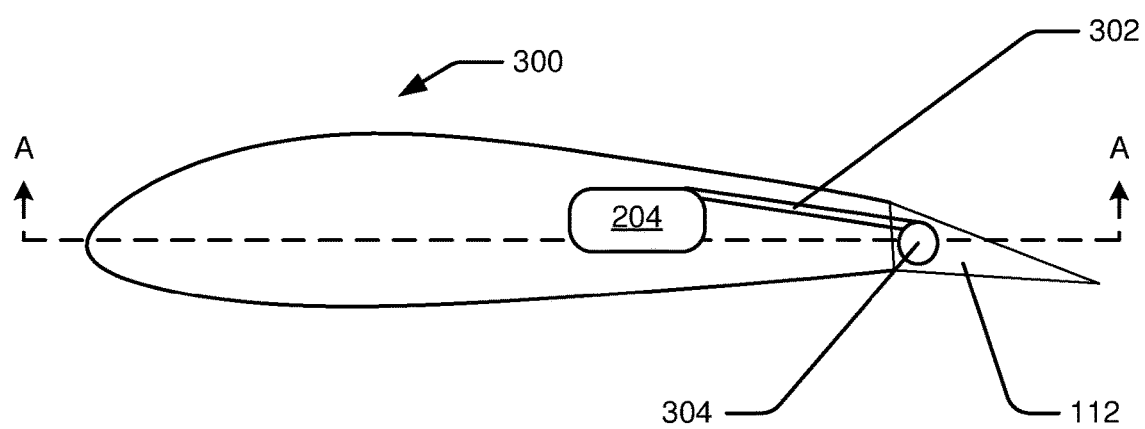

FIG. 3 depicts the active winglet 100 of FIGS. 1 and 2 and includes a cross-sectional view 300 of the active winglet 100, taken along line A-A. The cross-section 300 runs across the body portion 104 of the winglet 100. Additionally, the cross-section 300 of the body portion 104 of the winglet 100 illustrates one embodiment of the components of the control system 204 of FIG. 2 located in the active winglet 100. As shown in FIG. 3, the control system 204 may be located in the body portion 104 of the winglet 100; however, the control system 204 may be located in the angled portion 106 of FIG. 1 of the winglet 100, in other portions of the active winglet 100, or in any location on the aircraft.

In one embodiment, by way of example only, the control system 204 may be communicatively and/or mechanically coupled to the control surface 112 by way of a connection 302. FIG. 3 illustrates the connection 302 as one substantially straight coupling from the control system 204 to the control surface 112. However, the connection 302 may bend, turn, pivot, or be a series of multiple connections to make the connection 304. The connection 304 between the control system 202 and the control surface 112 may be operable by electronic, mechanic, or any other resource for coupling the control surface 112 to the control system 204. The control surface 112 may be coupled to the active winglet 100 by a hinge, pivot, or other swivel device 304 to allow the control surface 112 to rotate the aft end up and/or down in relation to the body of the active winglet 100. As noted above, to the commands given by the control system 204 to operate the control surface 112 of the active winglet may be based on the load factor data received by the control system 204 from the sensors 114 on the aircraft 202.

Figure 4:
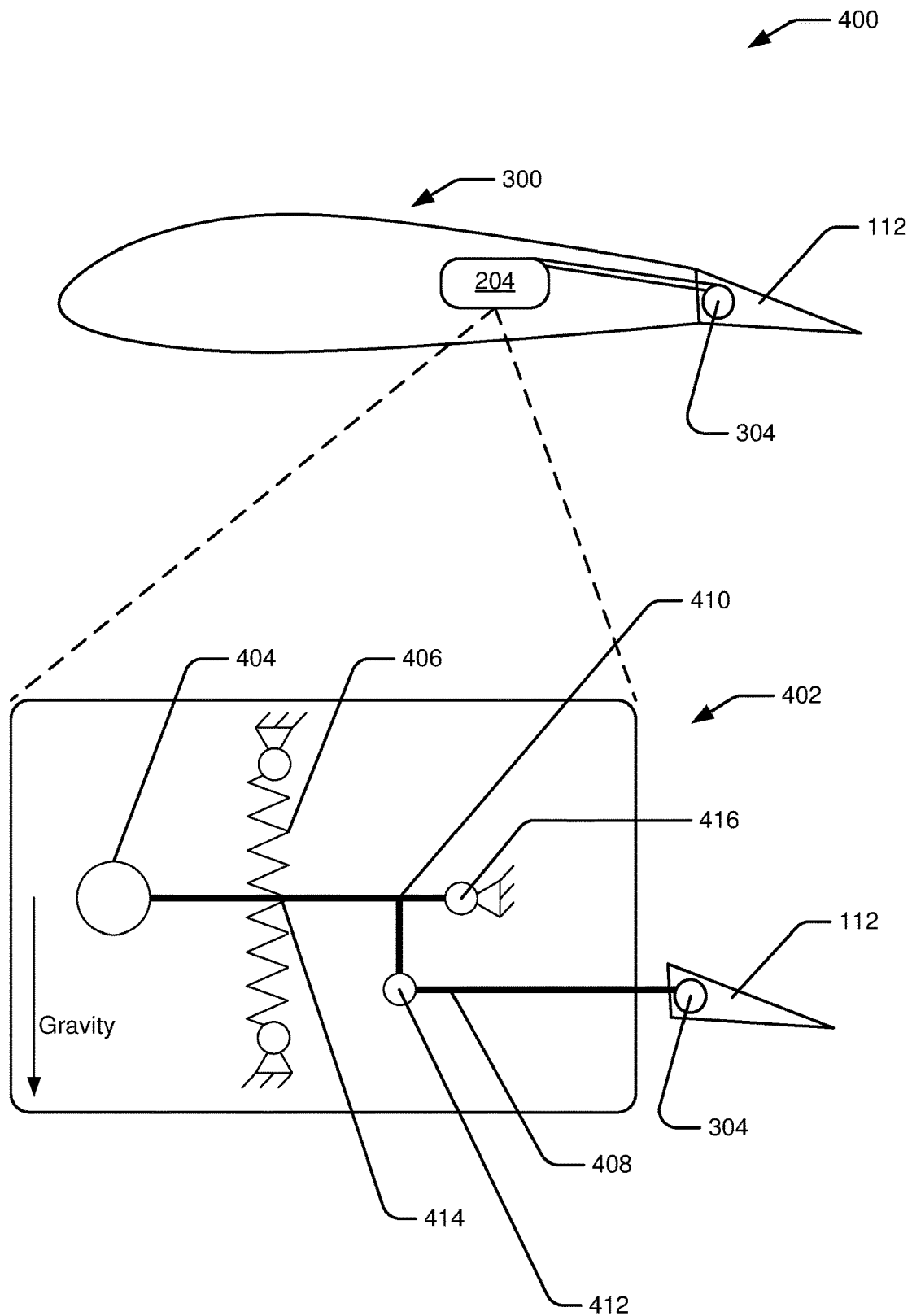
FIG. 4 depicts an illustrative cross-section of the active winglet of FIG. 1 with a mechanical control system.

FIG. 4 illustrates one embodiment 400 of the control system 204 as seen through the cross-section 300 of active winglet 100. As discussed with reference to FIGS. 2 and 3, the control system 204 may control the control surface 112 of the active winglet 100 based on in-flight load factor data. The control system 204 may be coupled to the control surface 112 which may be illustrative of the airflow modification device 110 illustrated in FIG. 1. The control surface 112 may be coupled to the active winglet 100 by a hinge, pivot, or other swivel device 304 to allow the control surface 112 to move in relation to the commands given by the control system 204.

Additionally, by way of example only, FIG. 4 depicts an illustrative embodiment of a mechanical control system 402. The mechanical control system 402 may include of a bob weight 404 coupled to a spring 406. The bob weight 404 may be fabricated of lead, or any other weight which may activate the mechanical control system 402. The spring 406 may be made of coil springs, bow springs, or any other device used to create resistance for the bob weight 404. In one embodiment, and by way of example only, the bob weight 404 may be coupled to the control surface 112 by way of a coupling system 408. By way of example only, coupling system 408 may be a rigid object, belt, chain, or other resource for coupling the bob weight 404 to the control surface 112. The coupling system 408 is illustrated by way of example only, with two pivot points 410 and 412, and one fixed point 414. The coupling system 408 may also contain a series of pivot points, angles, or other connections. The coupling system 408 may be configured to connect to spring 406 at the fixed point 414.

In one embodiment, the mechanical system 402 may be configured to react to in-flight conditions, for example, a gust of wind, maneuvers produced by one or more pilots, or any other condition on the wing of the aircraft. Based on the in-flight conditions, the bob weight 404 may change position within the mechanical system 402 relative to the spring. For example, the bob weight 404 may drop, lift, or otherwise change location, depending on the in-flight conditions. When the bob weight 404 changes location, it may cause the coupling system 408 to initiate a resistance force on the spring 406 causing a counter weight 416 to move in the opposite direction. Consequently, motion of the counter weight 416 may adjust the two pivot points 410 and 412 such that the coupling system 408 causes the connection 306 to adjust the control surface 112.

Figure 5:
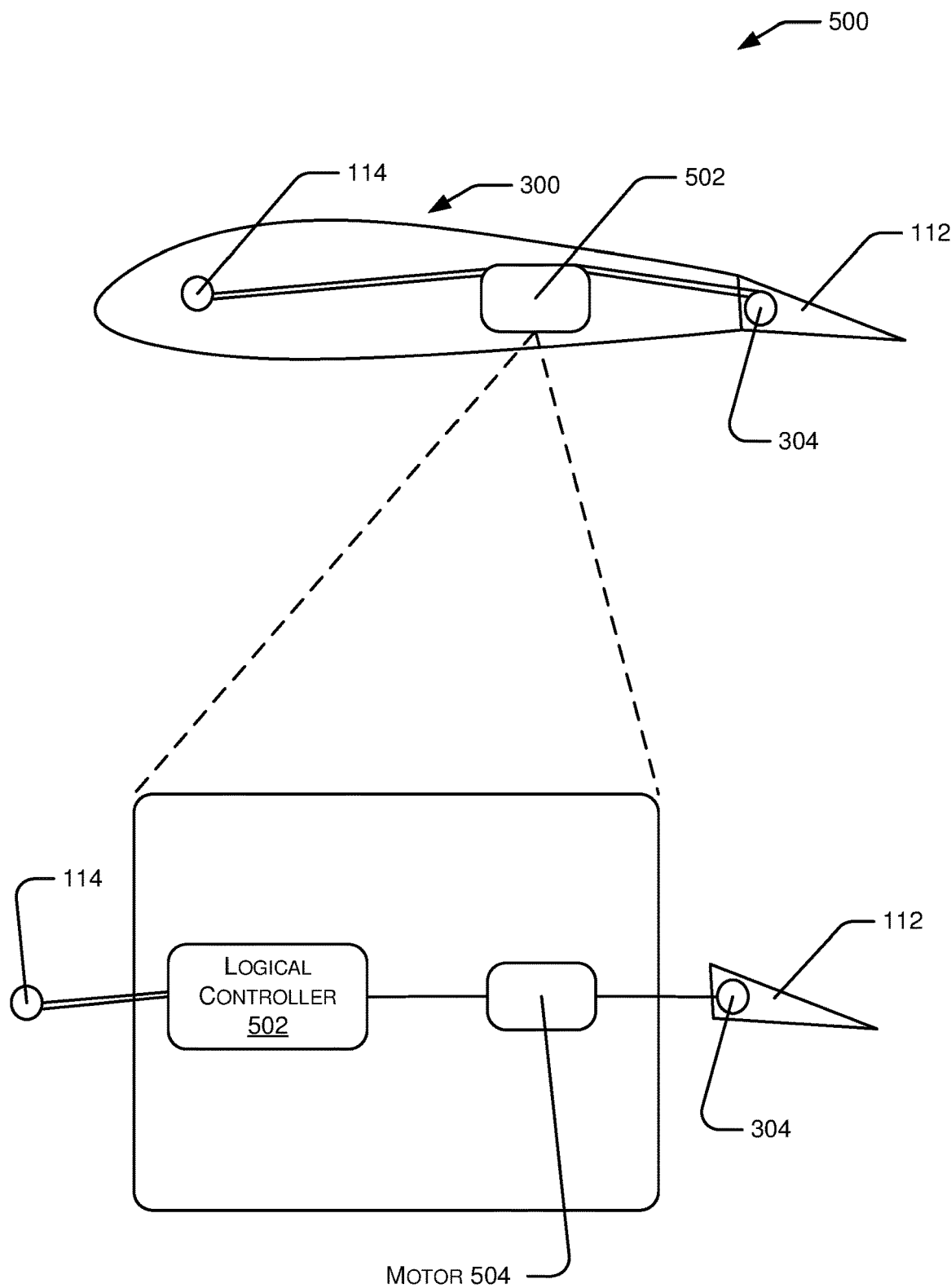
FIG. 5 depicts an illustrative cross-section of the active winglet of FIG. 1 with a computer controlled control system.

FIG. 5 illustrates an additional embodiment 500 of a logical controller 502 as seen through the cross-section 300 of active winglet 100. As discussed with reference to FIGS. 2-4, the logical controller 502, much like the control system 204 of FIG. 4, may control the control surface 112 of the active winglet 100 based on in-flight load factor data. By way of example, and not limitation, the embodiment 500 of FIG. 5 may include one or more sensors 114, a logical controller 502, and a motor 504. The sensors 114 may be representative of the sensors illustrated in FIG. 1. The sensors 114 may be electronically coupled to the logical controller 502. The logic controller 502 may be coupled to the motor 504. The motor 504, by way of example only, may be an electric motor. In one example, the motor 504 may be coupled to the control surface 112. The motor 504 may be able to rotate the aft portion of the control surface 112 up or down, depending on the received in-flight conditions and the predetermined load factors programmed into the logical controller 502. Additionally, the motor 504 may be coupled to the control surface 112 by way of electronic, pneumatic, hydraulic, or another resource for actuating the control surface 112. In at least one embodiment, and by way of example only, the motor 504 may cause the control surface 112 to pivot on an axis, moving the aft portion up and or down to adjust the control surface 112 as calculated by the logical controller 502.

The logical controller 502 may be located in the active winglet 100, the cockpit (not shown), the main fuselage of the aircraft (not shown), or anywhere located on the aircraft. In-flight load factor data may be first received by the sensors 114 located on the aircraft 202. The information may be resulting from deliberate in-flight maneuvers by a pilot, gusts of wind, or other causes of change in conditions to the aircraft. Information gathered by the sensors 114 may be received by the logical controller 502 and the data may be analyzed or otherwise processed. In one example, the logical controller 502 may be programmed with predetermined load factors which may be representative of a specific make and model of the aircraft. Additionally, the logical controller 502 may calculate the position of the control surface 112 based on the in-flight conditions to minimize the moment load on the wing. In other words, the logical controller 502 may receive the in-flight conditions and determine the needed position of the control surface 112. Additionally, the logic controller 502, may send a signal to the motor 504 to which it may be coupled to effectuate control of the control surface 112. By way of example only, the motor 504 may be electronic, pneumatic, hydraulic, or any other type of motor.

Illustrative Comparison Graphs

Figure 6:
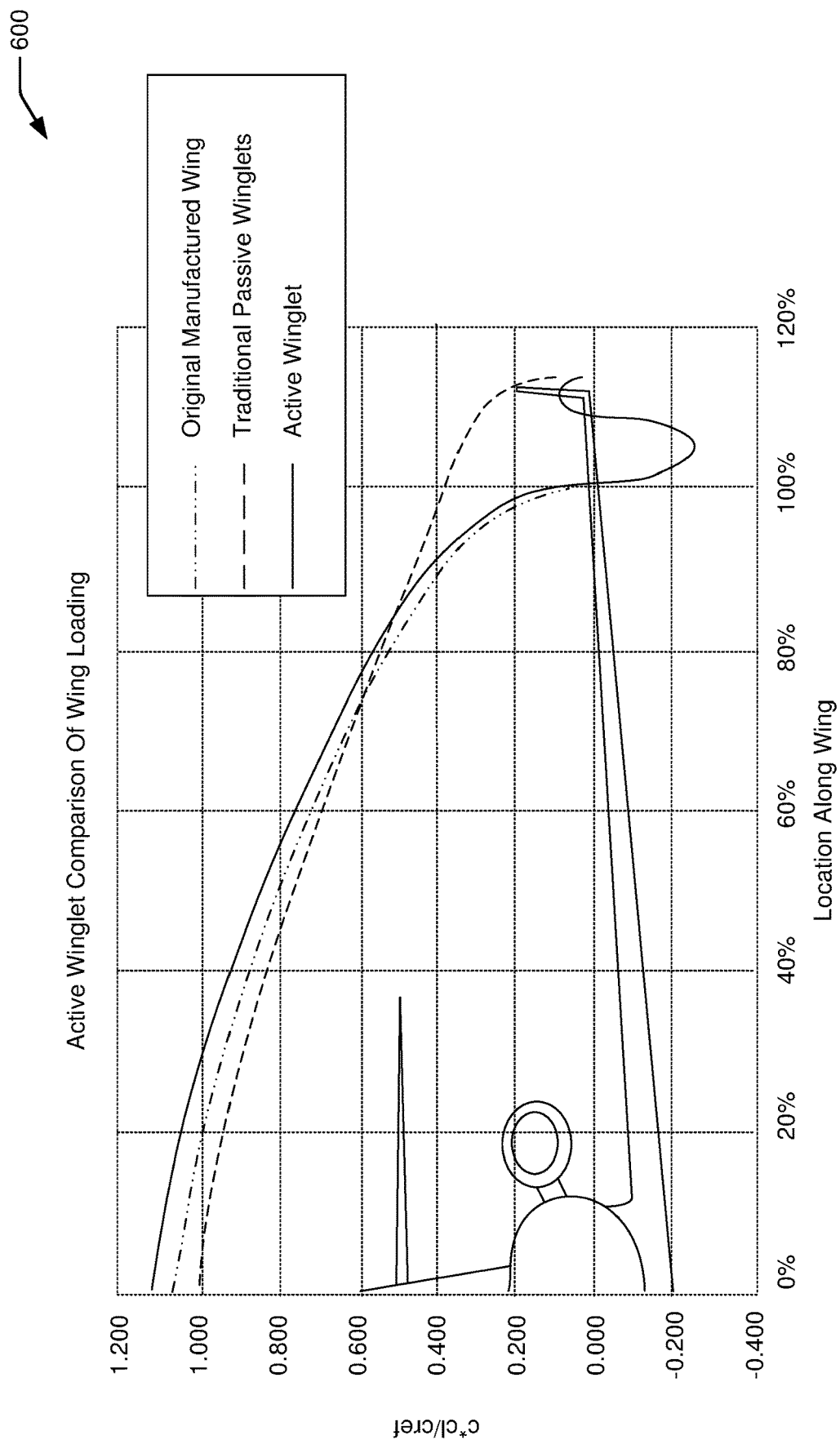
FIG. 6 depicts a design load comparison graph.

FIG. 6 illustrates a graph 600 which compares the load factor on a wing of an aircraft in relation to the location on the wing of the aircraft. The wing of FIG. 6 is a general representation of a wing and is not made representative of a specific make or model of an aircraft wing. The X-axis of the graph is illustrative of the location on the wing. It is represented in percentage (%) of the semi-span of the wing.

The length of the wing is only a representation and is not limiting of the size of the wing on which an active winglet 100 may be installed. The Y-axis is representative of the lift distribution on the wing. The load is higher the closer to the center of the airplane. The graph 600 is for illustrative purposes only, and illustrates one example of the load distribution which an aircraft may experience. The graph 600 is not restrictive of whether or not the distributed load may be more or less at any point on the graph. The graph 600 is representative of the basic shape of the distributed load a wing may encounter.

The graph 600 illustrates the lift distribution on a traditional manufactured wing, which is represented by the line on the graph 600 with a dash and two dots. The graph 600 also illustrates the lift distribution on the wing when a traditional winglet is installed, which is represented by the dashed line. Additionally, the graph 600 illustrates the lift distribution on the wing when an active winglet 100 is incorporated on the wing. The comparison illustrates that the lift distribution caused by the traditional winglet may be greater at the wingtip. This may move the center of lift of the wing outboard which may increase the wing bending loads. However, when the wing has an active winglet 100 utilizing the load alleviation active winglet system 200 the lift distribution at the wing tip may drop significantly lower than that of a traditional winglet. The graph 600 illustrates that the load may even drop below zero at the location of the wing tip (the point furthest away from the aircraft). These loads are representative of the design load on the aircraft, which is the highest load an aircraft may see. When the active winglet controllable surfaces 112 are undeployed, the active winglet 100 produces the same efficiency benefits of a passive or fixed winglet. When the load factor increases and the loads on the wing increase, the control surfaces 112 on the winglet 100 may adjust to reduce the loads on the wing. In one embodiment, the active winglet control surfaces 112 may be undeployed or undeflected the majority of the time. However, in another embodiment, they may only be deployed when the load on the wing approaches the original design loads.

Figure 7:
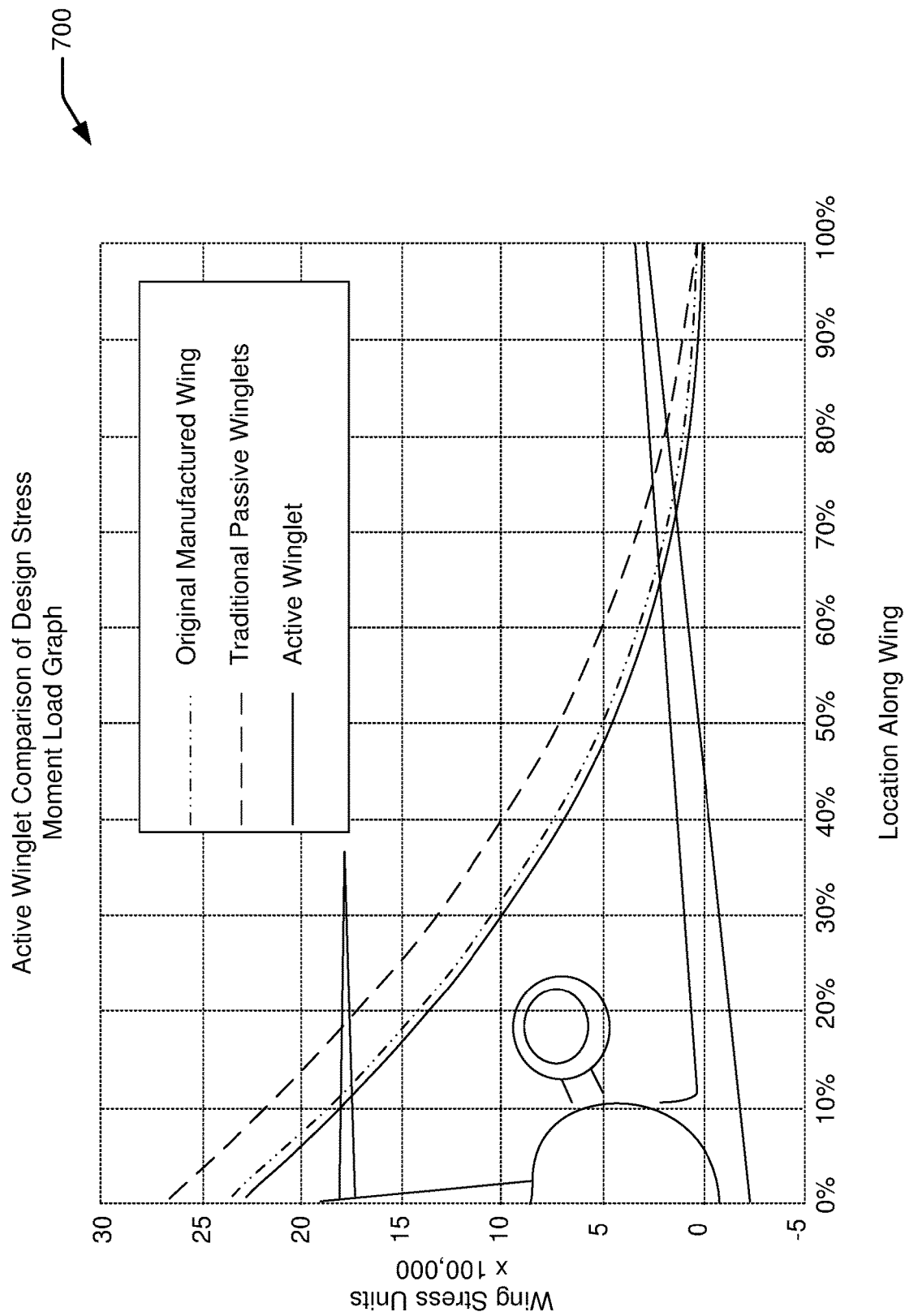
FIG. 7 depicts a design stress and moment load comparison graph.

FIG. 7 illustrates a graph 700 representing a wing design stress comparison of active winglet systems, a wing with a winglet with no active system, and a standard wing. The design stress or design load is the critical load to which the wing structure is designed to carry. The X-axis represents the location along the length of an aircraft's wing. The unit is shown in percentage (%) of wing semi-span. The length of the wing is only a representation and is not limiting of the size of the wing on which an active winglet 100 may be installed. Additionally, in FIG. 7, the Y-axis represents the load on the wing. This load is illustrative of the design root bending moment load. The comparison shows the standard load that the wing bears. The graph 700 is for illustrative purposes only and is not meant to be restrictive in any way. The root bending moment load may be greater or smaller for varying wing makes and models. The graph 700 also shows the load of a wing when a winglet is added with no active systems. The graph 700 additionally shows the loads on the wing when a winglet is added to the wing.

With the active winglet system 200 enabled on the winglet 100 the design moment loads may be lower than the design loads on the wing with a winglet with no active system. Additionally, with the active system 200 enabled on the winglet 100, the moment loads may be lower than the loads on the wings with no winglets installed. Traditional winglets increase wing stress, as a function of load factor, and substantially reduce the fatigue life of the wing. The slope of the "stress per g" curve is normally linear and the addition of passive winglets increases the slope which reduces the expected life and calculated life of the wing. Active winglets reduce the slope of this curve so that it is the same or lower than the slope of the original curve.

Illustrative Methods

Figure 8:
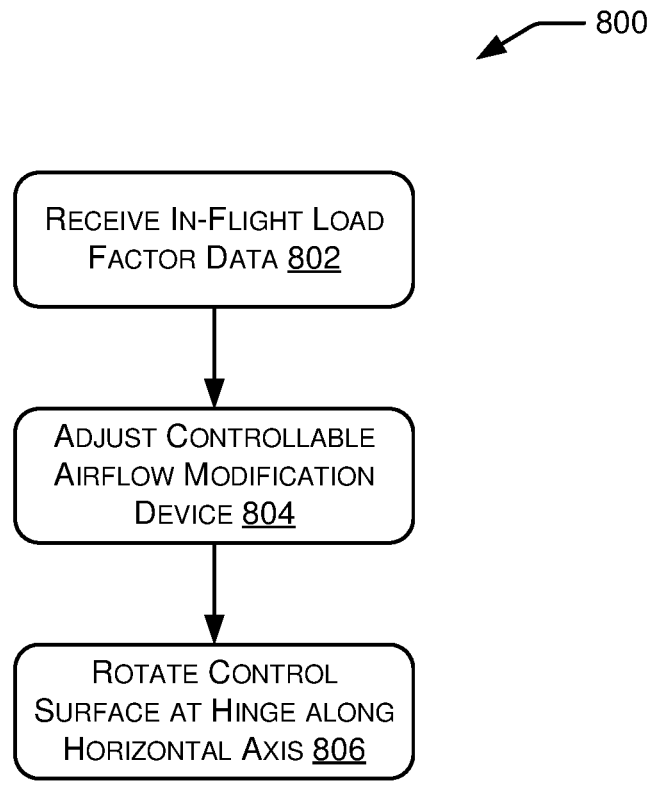
FIG. 8 depicts a flowchart illustrating details of a controllable airflow modification device.

FIG. 8 illustrates a flow diagram of one method 800 of receiving data, calculating, and positioning the control surface. As discussed above the sensors receive data based on the flight conditions of the aircraft. The method may, but not necessarily, be implemented by using sensors 112 shown in FIG. 1. In this particular implementation, the method 800 begins at block 802 in which the method 900 receives data from the sensors located on the aircraft. At block 804 the signal is received and computed with pre-registered data programmed into the adjustable control device. The adjustable control device in block 804 sends a signal, based on the calculation, to block the control surface 806. At block 806 the control surface receives the signal and may be adjusted up or down based on its hinge point, depending on the signal received from the adjustable control device.

CONCLUSION

Although embodiments have been described in language specific to structural features and/or methodological acts, it is to be understood that the disclosure is not necessarily limited to the specific features or acts described. Rather, the specific features and acts are disclosed as illustrative forms of implementing the embodiments.

What is claimed is:

1. An aircraft comprising:
a fuselage;
a baseline wing, the baseline wing coupled to the fuselage at a first end of the baseline wing and having an aileron; and
a wing extension comprising:
a horizontal portion coupled to a second end of the baseline wing, such that the horizontal portion is outboard of the baseline wing; and
a controllable airflow modification device directly coupled to the horizontal portion inboard of a wingtip and controllable independently of the aileron, the controllable airflow modification device configured to respond actively or passively to a flight condition.

2. The aircraft of claim 1, the controllable airflow modification device, comprising:
a control surface disposed at a trailing edge of the wing extension, such that the control surface is substantially parallel to the baseline wing; and
a control system for controlling motion of the control surface based at least in part on in-flight load data.

3. The aircraft of claim 2, the control surface being specifically configured for the aircraft based at least in part on flight data.

4. The aircraft of claim 2, the control surface being adjustable electronically, mechanically, hydraulically, pneumatically, or combinations thereof.

5. The aircraft of claim 2, the control system being communicatively coupled to a sensor located on the aircraft and configured to receive a signal from the sensor located on the aircraft.

6. The aircraft of claim 1, the controllable airflow modification device, comprising:
a control surface disposed at a trailing edge of the wing extension, such that the control surface is substantially parallel to the baseline wing; and a passive control system for controlling motion of the control surface based at least in part on the flight condition.

7. The aircraft of claim 6, the passive control system comprising a bob weight coupled to the control surface such that the bob weight moves relative to the wing extension in response to the flight condition causing the control surface to deflect.

8. A wing extension fixedly attachable to a baseline wing of an aircraft, the wing extension comprising:
- a horizontal portion that is substantially parallel to the baseline wing of the aircraft, the horizontal portion being configured to fixedly attach to an outboard portion of the baseline wing of the aircraft; and
- a controllable airflow modification device directly coupled to the horizontal portion of the wing extension inboard of a wingtip and controllable independently of an aileron, the controllable airflow modification device configured to respond actively or passively to a flight condition.

9. The wing extension of claim 8, the controllable airflow modification device being coupled to a trailing edge of the horizontal portion of the wing extension.

10. The wing extension of claim 8, the horizontal portion being configured to fixedly attach outboard of the aileron, a flap of the baseline wing of the aircraft, or combinations thereof.

11. The wing extension of claim 8, at least one of the horizontal portion or the controllable airflow modification device being specifically configured for a specific aircraft.

12. The wing extension of claim 11, the controllable airflow modification device being specifically configured for the specific aircraft based at least in part on flight data of the specific aircraft.

13. The wing extension of claim 8, the controllable airflow modification device being configured to adjust a control surface of the wing extension electronically, mechanically, hydraulically, pneumatically, or combinations thereof.

14. The wing extension of claim 8, the controllable airflow modification device being coupled to a control system for controlling a control surface of the controllable airflow modification device.

15. The wing extension of claim 14, the control system comprising a control device with control logic, the control device being communicatively coupleable to a sensor located on the aircraft.

16. The wing extension of claim 15, the control device being configured to receive a signal from the sensor located on the aircraft to indicate in-flight load factors, flight conditions of the aircraft, or combinations thereof.

17. The wing extension of claim 16, the control device being further configured to adjust the controllable airflow modification device at least partly based on the signal from the sensor located on the aircraft.

18. The wing extension of claim 8, further comprising an angled portion projecting upward at an angle from the horizontal portion.

19. The wing extension of claim 8, the controllable airflow modification device, comprising:
- a control surface disposed at a trailing edge of the wing extension, such that the control surface is substantially parallel to the baseline wing; and
- a passive control system for controlling motion of the control surface based at least in part on the flight condition.

20. The wing extension of claim 19, the passive control system comprising a bob weight coupled to the control surface such that the bob weight moves relative to the wing extension in response to the flight condition causing the control surface to deflect.

* * * * *